US010961347B2

(12) United States Patent
Browne et al.

(10) Patent No.: US 10,961,347 B2
(45) Date of Patent: Mar. 30, 2021

(54) PROCESS FOR PREPARING POLYOXYALKYLENE POLYOLS BY THE CONTINUOUS ADDITION OF STARTER

(71) Applicant: COVESTRO LLC, Pittsburgh, PA (US)

(72) Inventors: Edward P. Browne, Cologne (DE); Anthony R. Loveday, Weirton, WV (US); Jose F. Pazos, Charleston, WV (US)

(73) Assignee: Covestro LLC, Pittsburgh, PA (US)

( * ) Notice: Subject to any disclaimer, the term of this patent is extended or adjusted under 35 U.S.C. 154(b) by 274 days.

(21) Appl. No.: 16/225,549

(22) Filed: Dec. 19, 2018

(65) Prior Publication Data

US 2020/0199295 A1    Jun. 25, 2020

(51) Int. Cl.
*C08G 65/12*    (2006.01)
*C08G 65/26*    (2006.01)

(52) U.S. Cl.
CPC ..... *C08G 65/2663* (2013.01); *C08G 65/2696* (2013.01); *C08G 2650/22* (2013.01)

(58) Field of Classification Search
CPC .. C09D 171/00; C09D 171/02; C09D 171/08; C08G 65/2663; C08G 65/1202; C08G 65/2603; C08G 65/2606; C08G 65/2618; C08G 65/2636; C08G 65/2639
See application file for complete search history.

(56) References Cited

U.S. PATENT DOCUMENTS

| 3,427,334 | A | 2/1969 | Belner |
| 3,941,849 | A | 3/1976 | Herold |
| 4,477,589 | A | 10/1984 | van der Hulst et al. |
| 5,158,922 | A | 10/1992 | Hinney et al. |
| 5,470,813 | A | 11/1995 | Le-Khac |
| 5,482,908 | A | 1/1996 | Le-Khac |
| 5,689,012 | A | 11/1997 | Pazos et al. |
| 5,777,177 | A | 7/1998 | Pazos |
| 5,919,988 | A * | 7/1999 | Pazos ................ C08G 65/2609 568/679 |
| 6,077,978 | A | 6/2000 | McDaniel et al. |
| 7,919,575 | B2 | 4/2011 | Browne |
| 2015/0038664 | A1* | 2/2015 | Hayashi ............. C08G 65/2663 528/29 |

* cited by examiner

*Primary Examiner* — Shane Fang
(74) *Attorney, Agent, or Firm* — N. Denise Brown

(57) ABSTRACT

This invention relates to an improved process for the preparation of a high molecular weight polyoxyalkylene polyether polyol by the continuous addition of starter (CAOS) process. This process enables a shorter cycle time while maintaining a low viscosity in high molecular weight polyoxyalkylene polyether polyols.

16 Claims, No Drawings

PROCESS FOR PREPARING POLYOXYALKYLENE POLYOLS BY THE CONTINUOUS ADDITION OF STARTER

FIELD OF THE INVENTION

This invention relates to an improved process for the preparation of high molecular weight polyoxyalkylene polyols by the continuous addition of starter.

BACKGROUND

The ability to make narrow polydispersity products with double metal cyanide (DMC) catalysts relies on the rate of exchange at the catalyst surface being faster than (or at least comparable to) the rate of the propylene oxide (PO) addition reaction. When exchange is substantially faster than propoxylation, as it is for relatively low molecular weight polyols such as 500 equivalent weight (EW) diols, the polydispersity (and hence the viscosity) is relatively insensitive to addition time, mixing, catalyst concentration and temperature (the latter three variables affecting exchange rates).

As the equivalent weight of the polyoxyalkylene polyol increases (for example, to about 5000 Da), the viscosity of the product becomes sensitive to process conditions. For even higher EW products (i.e. at least 5000), these problems become more severe. High EW polyols exchange more slowly and therefore require longer addition times to achieve comparable polydispersity at lower equivalent weights. When higher EW products were first developed, it was found that extended addition times (i.e. 16 hours) were required when using reactors with standard mixing configurations (e.g. lower Rushton impeller, upper turbine impellers). In reactors fitted with gate-type agitators, faster feed times (9 hrs. or less) are feasible. This may be due to greater shear close to the reactor walls. A need exists in the art to achieve faster feed times without requiring expensive equipment modifications (such as gate agitators).

Although it is possible to make high equivalent weight polyoxyalkylene polyols (i.e. at least 5000 Da), it was necessary to use long cycle times, or at least an alkylene oxide feed profile in which the feed rate is reduced towards the end of the batch, in order to avoid high viscosity products with broad molecular weight distributions. Thus, a need exists for a process to enable the production of these high equivalent weight polyoxyalkylene polyols using shorter cycle times in which the products have low viscosities and narrow molecular weight distributions.

Without wishing to be bound by a particular theory, the slower exchange at the catalyst surface may be a function of slower diffusion of the newly-reacted polyol molecule away from the catalyst surface and slower diffusion of the polyol molecules that are trying to reach the catalyst surface. Catch-up kinetics (as displayed by DMC catalysts and described in U.S. Pat. Nos. 5,689,012 and 5,777,177) favors lower EW molecules only if they can get to the surface. When using the continuous addition of starter (CAOS) process, it has been found that low equivalent weight starters such as, for example, propylene glycol, can diffuse very rapidly to the catalyst surface which provides a constant renewal of low equivalent weight molecules on the catalyst surface. The presence of these low equivalent weight molecules increases the exchange rate and decreases the required addition times. It has also been found that this process has the unexpected result of producing a high equivalent weight product with a low viscosity.

SUMMARY

This invention relates to a process for the preparation of a polyoxyalkylene polyol (P) having an equivalent weight of at least 5000 Da by reaction of H-functional starter substances ($S_i$) and ($S_c$) with one or more alkylene oxide(s) in the presence of a double metal cyanide catalyst (DMC). This process for preparing a polyoxyalkylene polyol (P) having an equivalent weight of at least 5000 Da, comprises:

(α) forming a starter mixture comprising the H-functional starter substance ($S_i$) and a double metal cyanide catalyst, and optionally, stripping the starter mixture with vacuum;

(γ) continuously adding (a) an alkylene oxide to the starter mixture from (α);

(δ) continuously adding an H-functional starter substance ($S_c$);

wherein:
(i) steps (γ) and (δ) either start simultaneously or step (γ) starts before step (δ);
(ii) the H-functional starter substance ($S_i$) has an equivalent weight of at least 2000 Da and a functionality of 1 to 6;
(iii) the H-functional starter substance ($S_c$) has an equivalent weight of 9 Da to 150 Da and a functionality of 1 to 6; and
(iv) in step (γ) the total time of addition of the continuously added alkylene oxide from the beginning of the feed to the end of the feed is less than 15 hours.

The process of the invention may additionally comprise:
(β) adding an activation amount of (b) an alkylene oxide to the starter mixture of step (α),
wherein in step (γ) the continuous addition of (a) the alkylene oxide is to the mixture formed in step (β).

DETAILED DESCRIPTION OF THE INVENTION

Various embodiments are described and illustrated in this specification to provide an overall understanding of the structure, function, operation, manufacture, and use of the disclosed products and processes. The various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated herein by reference in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference herein to "certain embodiments", "some embodiments", "various non-limiting embodiments," or the like, means that a particular feature or characteristic may be included in an embodiment. Thus, use of such phrases, and similar phrases, herein does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. Thus, the articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, "polymer" encompasses prepolymers, oligomers and both homopolymers and copolymers; the prefix "poly" in this context referring to two or more.

Equivalent weights and molecular weights given herein in Daltons (Da) are weight average equivalent weights and weight average molecular weights respectively, unless indicated otherwise, and were determined by GPC as described herein.

The number average and weight average, Mn and Mw, respectively, molecular weights herein were determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

Hydroxyl numbers or OH numbers were determined according to ASTM D4274-11, and are reported in mg [KOH]/g [polyol].

As used herein "viscosity" is in millipascal-seconds (mPa·s) measured at 25° C. The viscosity was measured on an Anton Paar SVM3000 viscometer at 25° C. that has been demonstrated to give equivalent results as can be generated with ASTM-D4878-15. The instrument was calibrated using mineral oil reference standards of known viscosity.

As used herein, a polyoxyalkylene polyol with a narrow molecular weight distribution means one that is symmetrical or a molecular weight distribution in which the left side of the distribution mirrors the right side of the distribution. In other words, the molecular weight distribution is not skewed to one side or the other and has no second peaks or shoulders on one side or on both sides. Symmetrical means that there are no shoulders, peaks or tailing out on either side of the main peak. As would be recognized by one skilled in the art, a perfect monomodal material has a PDI (polydispersity index) of 1.00.

In accordance with the present invention, the process comprises (α) forming a starter mixture comprising a H-functional starter substance ($S_i$) and a double metal cyanide catalyst, in which the starter mixture is optionally stripped under vacuum. The vacuum stripping can occur with or without nitrogen and/or steam. This starter mixture is typically formed in a reactor. The portion of double metal cyanide catalyst and H-functional starter substance ($S_i$) is effective to initiate polyoxyalkylation of the starter mixture once an alkylene oxide is introduced into the reactor.

The process of the invention requires two different types of starters: an initially charged H-functional starter substance ($S_i$) and a continuously added H-functional starter substance ($S_c$). The initially charged H-functional starter substance ($S_i$) is different than the continuously added H-functional starter substance ($S_c$). The initially charged H-functional starter substance ($S_i$) comprises one or more compounds having one or more active hydrogens per molecule.

Suitable H-functional starter substances ($S_i$) to be used in accordance with the present invention include, for example, a polyoxyalkylene polyol which has an equivalent weight of at least 2000 Da and a functionality of 1 to 6. In addition, the equivalent weight of suitable H-functional starter substance ($S_i$) is preferably less than 95%, or more preferably less than 90%, of the equivalent weight of the polyoxyalkylene product, i.e. the polyoxyalkylene polyol (P) that is being formed. In one embodiment, the functionality of the H-functional starter substance ($S_i$) ranges from 1 to 6, and the equivalent weight ranges from at least 2000 Da to less than 5000 Da.

When the H-functional starter substance ($S_i$) of the starter mixture comprises a polyoxyalkylene polyol, this polyoxyalkylene polyol can be a known residual amount of the product left in the reactor from a prior batch of the same product. This polyoxyalkylene polyol may be prepared from the same reactants as the final product prepared by the process of the invention, have the same functionality, molecular weight and hydroxyl number as the final product resulting from the process of the present invention, and thus be essentially the same as the final product prepared by the instantly claimed process. The skilled artisan would, however, recognize that it not actually the same product as the final product since it was prepared in a different lot or reactor batch. As an example, after completion of the production of a batch of polyoxyalkylene polyol in a reactor by DMC catalysis, 90% of the product is removed from the reactor. The remaining 10% of the polyoxyalkylene polyol product can be left in the reactor and used as the H-functional starter substance ($S_i$) of the starter mixture of the present invention. It is also possible that the H-functional starter substance ($S_i$) of the starter mixture can comprise a final polyoxyalkylene polyol product that is stored in a finished goods storage vessel from a previous campaign which can be brought back into the reactor as the H-functional starter substance ($S_i$) of the starter mixture. The H-functional starter substance ($S_i$) of the starter mixture can also comprise a final polyoxyalkylene polyol product that has a similar molecular weight as the target product that was made using any alkoxylation catalyst known in the art, examples are basic catalysts (KOH or equivalent) and acid catalysts (Lewis acid or Bronsted acid induced catalysis), and which was refined to remove or neutralize the basic or acidic catalyst. The use of a basic catalyzed and subsequently neutralized polyoxyalkylene product is necessary, for example, when using this product as the H-functional starter substance ($S_i$) for the initial or first production of the polyoxyalkylene polyol (P) product. Removal or neutralization of the basic catalyst from the final polyoxyalkylene polyol product to be used as the H-functional starter substance ($S_i$) is required, as those skilled in art will recognize, because even trace levels of base or alkalinity deactivates and/or inhibits the DMC catalyst present in the starter mixture. In all cases, when a polyoxyalkylene polyol is used as the H-functional starter substance ($S_i$), the polyoxyalkylene polyol acts as a reaction medium to provide the minimum starter charge required by the reactor configuration (e.g. cover agitator blade, fill recirculation loop, cover internal heating/cooling coils, etc.). In one embodiment, the polyoxyalkylene polyol which is used as the H-functional starter substance ($S_i$) of the starter mixture has an equivalent weight that is less than 95%, or preferably less than 90% of the equivalent weight of targeted final polyoxyalkylene polyol product (P). In one embodiment, the polyoxyalkylene polyol used as the H-functional starter substance ($S_i$) of the starter mixture does not substantially participate in the reaction. The minimization of the molecular weight growth of the H-functional starter substance ($S_i$) of the starter mixture which comprises a polyoxyalkylene polyol provides the opportunity to produce a final product with a narrow molecular weight distribution and low viscosity. In one embodiment, this H-functional starter substance ($S_i$) of the starter mixture may comprise a polyoxyalkylene polyol that contains double metal cyanide catalyst residuals. In one embodiment, the double metal cyanide catalyst residuals were previously exposed to alkylene oxide. In one embodiment, the double metal cyanide catalyst residuals of the polyoxyalkylene polyol used as the H-functional starter substance ($S_i$) of the starter mixture were previously exposed to alkylene oxide under reaction conditions ("preactivated" catalyst).

The H-functional starter substance ($S_i$) comprising a polyoxyalkylene polyol can contain antioxidants and/or acids known to those skilled in the art. For example, suitable antioxidants for polyoxyalkylene polyols include sterically hindered phenolic compounds such as BHT (i.e. butylated hydroxytoluene), octadecyl 3-(3,5-di-tert-butyl-4-hydroxyphenyl) propionate (i.e. Irganox 1076), 3,4-dihydro-2,5,7,8-tetramethyl-2-(4,8,12-trimethyltridecyl)-2H-1-benzopyran-6-ol (i.e. Irganox E-201), etc. Examples of suitable acids include any inorganic protic mineral acid or organic acid which is known to be suitable as described in the art. Phosphoric acid is an example of a suitable acid.

The H-functional starter substance ($S_i$) which may comprise a polyoxyalkylene polyol can be vacuum stripped, with or without steam and/or nitrogen, to remove any residual compounds introduced from the reaction or the raw materials. Stripping of the H-functional starter substance ($S_i$) can occur either before or after the addition of the double metal cyanide catalyst. Vacuum stripping of the H-functional starter substance ($S_i$) can occur with or without steam and/or nitrogen at ambient temperature, reaction temperature, or any value in between.

Suitable double metal cyanide catalysts for the present invention include any DMC catalysts known in the art. The well-known DMC catalysts are typically the reaction product of a water-soluble metal salt (e.g. zinc chloride) and a water-soluble metal cyanide salt (e.g. potassium hexacyanocobaltate). The preparation of DMC catalysts is described in various references, including, for example, U.S. Pat. Nos. 5,158,922, 4,477,589, 3,427,334, 3,941,849, 5,470,813 and 5,482,908, the disclosures of which are herein incorporated by reference. Particular DMC catalysts that are preferred in some embodiments of the present invention are zinc hexacyanocobaltates. In one embodiment, the DMC catalysts are amorphous.

The DMC catalyst includes an organic complexing agent. As taught in the preceding references, the complexing agent is needed for an active catalyst. Preferred complexing agents include water-soluble heteroatom-containing organic compounds that can complex with the DMC compound. In one embodiment, the preferred complexing agents are water-soluble aliphatic alcohols. Tert-butyl alcohol is a preferred complexing agent for some embodiments. In addition to the organic complexing agent, the DMC catalyst may also include a polyether as is described in U.S. Pat. No. 5,482,908, the disclosure of which is herein incorporated by reference.

Preferred DMC catalysts for use in accordance with one or more embodiments of the present process are the highly active DMC catalysts such as are described in U.S. Pat. Nos. 5,482,908 and 5,470,813. High activity allows for the use of very low concentrations of the catalyst to be used. More specifically, the concentrations of catalyst required is typically low enough to overcome or eliminate any need to remove the catalyst from the finished polyoxyalkylene polyol products (P) formed in the process. In particular, the concentration of catalyst is typically in the range of from 10 ppm to 300 ppm, or from 20 ppm to 200 ppm, or from 30 ppm to 100 ppm.

The DMC catalyst can be added as a dry powder directly to the starter mixture, or dispersed in the H-functional starter substance ($S_i$) and added to the starter mixture. The DMC catalyst added to the starter mixture is the same as the DMC catalyst residual contained in the polyoxyalkylene polyol used as the H-functional starter substance ($S_i$) of the starter mixture. The DMC catalyst added to the starter mixture can be un-activated or fresh catalyst, i.e. catalyst that has not previously been exposed to alkylene oxide, catalyst that has been exposed to alkylene oxide under non-reaction conditions (i.e. temperature <90° C.); or "pre-activated" catalyst, i.e. catalyst that was previously exposed to alkylene oxide under reaction conditions (i.e. temperature ≥90° C.). The DMC catalyst residuals in the polyoxyalkylene polyol H-functional starter substance ($S_i$) of the starter mixture are considered "pre-activated" catalyst as this catalyst was exposed to alkylene oxides under reaction conditions during the making of the polyoxyalkylene polyol H-functional starter substance ($S_i$) of the starter mixture. The "pre-activated" catalyst in the polyoxyalkylene polyol H-functional starter substance ($S_i$) of the starter mixture is advantageous to the present invention to allow a rapid activation of the starter mixture when alkylene oxide is added. The combination of "pre-activated" catalyst from the polyoxyalkylene polyol H-functional starter substance ($S_i$) of the starter mixture and fresh or "pre-activated" catalyst added to the starter mixture also insures a good reaction (i.e. no rapid pressure increase or temperature fluctuations) when the continuously added H-functional starter substance ($S_c$) is added. The DMC catalyst added to the starter mixture can be the same as or different from the residual catalyst or "pre-activated" catalyst in the polyoxyalkylene polyol H-functional starter substance ($S_i$) of the starter mixture.

The DMC catalyst (which may be fresh catalyst or pre-activated catalyst) is typically added to the starter mixture. It can, however, also be split between the starter mixture and the continuously added H-functional starter substance ($S_c$). Splitting the DMC catalyst provides a lower initial catalyst concentration in the starter mixture, and a more uniform catalyst concentration during the production of the polyoxyalkylene polyol product (P).

In the process of the present invention, the DMC catalyst present in the starter mixture is activated in the presence of alkylene oxide. Activation of the DMC catalyst present in the starter mixture may occur by optionally (β) adding an activation amount of (b) an alkylene oxide to the starter mixture formed in step (α). The alkylene oxide for the activation of the starter mixture can be added all at once in step (β) to the starter ($S_i$ and DMC catalyst) mixture of step (α) wherein the pressure in the reactor system will increase rapidly, or the alkylene oxide can be slowly added during the initial ramp-up of the alkylene oxide feed in step (γ) wherein the pressure in the reactor system will increase slowly. The activation of the DMC catalyst present in the starter mixture is detected when the pressure decreases to half of the amount of the peak pressure detected in the case of the rapid addition of the alkylene oxide, or when the pressure begins to decrease and the reactor system begins to cool the reaction (indicating the presence of a reaction) in the case of slow addition of the alkylene oxide. The amount of alkylene oxide added for activation is from 1 to 12 weight percent based on the amount of the H-functional starter substance ($S_i$) present in the starter mixture. As used herein, the amount of alkylene oxide necessary to activate the DMC catalyst present in the starter mixture of step (α) may be referred to as the "initial" or "activation" alkylene oxide.

The process of the invention additionally comprises (γ) continuously adding (a) an alkylene oxide to the starter mixture of step (β) when step (β) is present or to the starter mixture of step (α) when step (β) is not present. This continuous addition comprises starting and increasing the addition of alkylene oxide in a steady manner until the final target feed rate of alkylene oxide is reached. The ramp-up of the alkylene oxide feed(s) typically takes from 5 to 35 minutes before reaching the final target feed rate(s).

Suitable alkylene oxides to be used as alkylene oxides (a) and/or (b) in accordance with the invention include, but are not limited to, compounds such as ethylene oxide, propylene oxide, 1,2- and 2,3-butylene oxide, isobutylene oxide, epichlorohydrin, cyclohexene oxide, and styrene oxide and mixtures thereof. In addition to the alkylene oxide block(s), carbon dioxide can be added in combination with the alkylene oxide(s) to form polyether carbonate polyols. The alkylene oxide(s) used as component (a) and/or (b) in the invention may be the same or different.

In accordance with the invention, the process additionally comprises (δ) continuously adding a H-functional starter substance ($S_c$).

Suitable compounds to be used as the continuously added H-functional starter substance ($S_c$) include, for example, compounds which have a (nominal) hydroxyl functionality of at least 1, or preferably of at least 2. These H-functional starter substances ($S_c$) also have an upper (nominal) hydroxyl functionality of 6 or less, or preferably of 3 or less. Thus, these H-functional starter substances ($S_c$) may have a (nominal) functionality ranging between any combination of these upper and lower values, such as, for example, of 1 to 6, or preferably of 2 to 3. The H-functional starter substances ($S_c$) typically have an equivalent weight of at least 9 Da. The H-functional starter substances ($S_c$) also typically have an equivalent weight of 150 Da or less, or preferably of 100 Da or less, or more preferably of 50 Da or less. Thus, the H-functional starter substances ($S_c$) may have an equivalent weight ranging between any combination of these upper and lower values, such as, for example, of greater than or equal to 9 Da to less than or equal to 150 Da, or preferably from about 9 Da to about 100 Da, or more preferably 9 to 50 Da. Suitable compounds to be used as the continuously added H-functional starter substance ($S_c$) herein, include compounds such as, for example, but are not limited to, ethylene glycol, 1,2-propanediol, 1,3-propanediol, 1,4-butanediol, 1,2-butanediol, 1,3-butanediol, 2,3-butanediol, water, glycerin, sorbitol, etc. Mixtures of monomeric initiators or their oxyalkylated oligomers may also be utilized.

In an embodiment of the invention, the continuously added H-functional starter substance ($S_c$) is selected from propylene glycol and/or glycerin.

The continuously added H-functional starter substances ($S_c$) can be acidified with a small amount of a suitable acid as described in, for example, U.S. Pat. Nos. 6,077,978 and 7,919,575. The acid may be any inorganic protic mineral acid or organic acid which is known to be suitable as described in the art. Typically, the amount of acid to be added to the continuously added H-functional starter substance ($S_c$) ranges from 30 to 250 ppm, based on the weight of the continuously added H-functional starter substance ($S_c$). In one embodiment, the continuously added H-functional starter substance ($S_c$) contains from 120 to 240 ppm of acid. Phosphoric acid is an example of a suitable acid.

In an embodiment of the present invention, in step (δ) the continuous addition of H-functional starter substance ($S_c$) is started and may be ramped simultaneously with the continuously added alkylene oxide in step (γ).

In accordance with the invention, the polyoxyalkylation of the H-functional starter substance ($S_c$) with the alkylene oxides from step (γ) and optionally from step (β) is completed to form a polyoxyalkylene polyol (P) having a functionality of 1 to 6 and an equivalent weight of at least 5000 Da. The polyoxyalkylene polyols (P) formed by the process of the present invention typically have functionalities of 1 to 6, or preferably from 2 to 3. The polyoxyalkylene polyols (P) produced by the process of the invention will typically have an equivalent weight of at least 5000 Da, or of at least 6000 Da, or of at least 8000 Da.

In the process of the present invention, (i) the steps (γ) and (δ) either start simultaneously or step (γ) starts before step (δ); (ii) the H-functional starter substance ($S_i$) has an equivalent weight of at least 2000 Da and a functionality of 1 to 6; (iii) the H-functional starter substance ($S_c$) has an equivalent weight of 9 Da and 150 Da or less and a functionality of 1 to 6; and (iv) in step (γ) the total time of addition of the continuously added alkylene oxide from the beginning of the feed to the end of the feed is less than 15 hours, or preferably less than 13 hours.

In one or more embodiments of the present process, the quantity of the initial H-functional starter substance ($S_i$) used depends on many factors, including, for example, the reactor dimensions, the identity of the H-functional starter substance ($S_i$), the equivalent weight(s) of the H-functional starter substance ($S_i$) and of the target product, the equivalent weight(s) of the continuously added H-functional starter substance ($S_c$), and other factors such as the minimum quantity of H-functional starter substance ($S_i$) needed to achieve proper mixing based on agitator and/or heat exchanger loop configuration. The amount of continuously added H-functional starter substance ($S_c$) is within the range of about 20 mole % to about 95 mole %, or from 30 to 90 mole %, based on the total amount of hydroxyl-equivalent moles of H-functional starter substances ($S_t$). The total amount of H-functional starter substances ($S_t$) equals the sum of the amount of continuously added H-functional starter substance ($S_c$) plus the amount of initially charged H-functional starter substance ($S_i$). Thus, $S_t = S_c + S_i$.

The alkylene oxide composition may also be varied during the initial polymerization of the initial H-functional starter substance ($S_i$) and/or at some point during and/or after the addition of the H-functional starter substance ($S_c$). This provides flexibility for controlling the distribution of alkylene oxides within the polyoxyalkylene polyether polyol and allows some control of the primary versus secondary hydroxyl functionality of the polyoxyalkylene polyether polyol product, and thus, the relative reactivity of the final composition. In this way, it is possible to design the product to meet the reactivity and performance requirements of the intended applications such as polyurethane foams.

In an embodiment of the invention, a solvent may be included to reduce the process viscosity. This solvent may be introduced to the reactor with the starter mixture comprising the H-functional starter substance ($S_i$) and a double metal cyanide catalyst. The solvent may or may not be removed following the reaction step.

In an embodiment of the invention, (v) in step (δ), the addition of the H-functional starter substance ($S_c$) is stopped when at least 90% by weight of the total amount of alkylene oxide added in step (γ) or in steps (β) and (γ), has been added. Preferably, the addition of the H-functional starter substance ($S_c$) is stopped when at least 95% by weight of the total amount of alkylene oxide added in step (γ) or in steps (β) and (γ) has been added. Stopping the addition of the continuously added H-functional starter substance ($S_c$) in this manner results in the polyoxyalkylation being completed with only the addition of alkylene oxide. This is referred to as a "non-CAOS" cap.

In accordance with the present invention, a continuously added H-functional starter substance ($S_c$) is also used. In conventional processes for preparing polyols (both KOH-catalyzed polyols and DMC-catalyzed polyols), the catalyst and the total amount of the starter is typically charged to the reactor at the start of the polymerization, and then alkylene oxide is continuously added. By comparison, in the present invention, the amount of continuously added H-functional starter substance ($S_c$) which is added to the reactor is within the range of about 20 to 95 mole %, or 30 to 90 mole %, based on the total hydroxyl-equivalent moles of initial H-functional starter substance ($S_i$) and continuously added H-functional starter substance ($S_c$), wherein the reactor contains the initial H-functional starter substance ($S_i$), alkylene oxide and DMC catalyst. During the continuous addition of H-functional starter substance ($S_c$), alkylene oxide is always added. It may also be advantageous to add a small amount of continuously added H-functional starter substance ($S_c$) up front with the initial H-functional starter substance ($S_i$) in order to minimize the polydispersity and viscosity of the final product. In accordance with the invention, the continuously added H-functional starter substance ($S_c$) may be mixed with the alkylene oxide or it may be added as a separate stream. If added as a separate stream, it may be advantageous to mix the continuously added H-functional starter substance ($S_c$) with alkylene oxide prior to entering the reactor.

In one embodiment, the (a) alkylene oxide of step (γ) and the continuously added H-functional starter substance ($S_c$) of step (δ) are intimately mixed prior to entering the reactor. Intimate mixing may occur by dissolving the continuously added H-functional starter substance ($S_c$) of (δ) in (a) the alkylene oxide of (γ) prior to being continuously introduced into the reactor.

In accordance with the invention, it is not necessary to use a non-CAOS cap (feeding alkylene oxide at the end of reaction with no ($S_c$) present), and in fact a large non-CAOS cap would be detrimental to the goal of minimizing the polydispersity and viscosity of the final product. Any non-CAOS cap used herein should not exceed 10% of the total batch weight, and preferably not exceed 5% of the total batch weight.

The beneficial effect of promoting exchange at the active catalyst becomes more important as the equivalent weight gets higher towards the end of a batch. Therefore, in an embodiment of the invention, up to 50% by weight of the alkylene oxide can be fed before starting to feed the continuously added H-functional starter substance ($S_c$), particularly if the molecular weight of the H-functional starter substance ($S_i$) is significantly lower than the molecular weight of the final product. In general, as the molecular weight of the H-functional starter substance ($S_i$) gets closer to the molecular weight of the final product, the earlier the CAOS (Continuous Addition of Starter) feed, i.e. step (δ) continuous addition of H-functional starter substance ($S_c$), should be started in the process. Also, since the continuous addition of the H-functional starter substance ($S_c$) promotes exchange towards the end of the batch, it is not necessary to decrease the rate of alkylene oxide addition at the end of the batch. In other words, it is not necessary to employ a feed rate ramp in which the feed rate is decreased towards the end to achieve good polydispersity and low viscosity of the final product.

In accordance with the invention herein, the process forms a high equivalent weight polyoxyalkylene polyether polyol, in which the viscosity of the product is lower than the viscosity of a similar high equivalent weight polyol prepared by the conventional non-CAOS DMC process. In addition, the process described herein forms a high equivalent weight product in which the cycle time is reduced compared to a similar high equivalent weight polyol prepared by a conventional non-CAOS DMC process.

In accordance with the present invention, the total time required for completion of the continuous feed of epoxide (i.e. alkylene oxide) from the beginning to the end is less than 15 hours. The total time required for completion of the continuous alkylene oxide feed may also be about 13 hours or less. It is possible but not necessary to combine this with an alkylene oxide feed rate ramp.

In accordance with the present invention, the process is typically carried out in a stainless steel reaction vessel (e.g. 35 Liter or larger) equipped with an electrically heated jacket and an internal coil that can be used for heating or cooling the reaction mixture. Steam, water or a combination of the two can be passed through cooling coil to control the reaction temperature. Tempered water or a hot oil system can also be used to control the temperature. The reactor system includes a mechanical agitator that can be equipped with a single agitating device such as a gate-type mixer or an anchor type mixer or other such devices known to those skilled in the art. The agitator could also be equipped with one or multiple mixers such as pitched blade impeller, Rushton-type impeller, flat blade, curved blade, tilted blade or other such devices known to those skilled in the art. The various types of blades can be used individually or in combination with one another. It is not necessary for the agitator blade to directly agitate the liquid surface at all times, particularly during the feeding of the alkylene oxide. When the agitator directly agitates the liquid surface of the reaction mixture in the production of a high equivalent weight polyoxyalkylene polyol, this can result in the product having a lower polydispersity. The agitator speed can be constant or varied during the batch. The reactor internals may include baffles. The reactor can also be equipped with a recirculation pump loop that withdraws the reaction mixture from the bottom portion of the reactor and pumps the reaction mixture back into the reactor through a dip tube or spray nozzle in the upper part of the reactor or through a dip tube or sparge ring at the bottom part of the reactor. The recirculation loop can include a heat exchanger for temperature control or can include a static mixing device. The reactor and associated metering and monitoring equipment are connected to digital process control system.

The reactor system includes an alkylene oxide dosing system for one or more alkylene oxide feeds (e.g. propylene and/or ethylene oxide). When more than one alkylene oxide is used, the alkylene oxides can be introduced to the reactor together or separately. They can be mixed and fed in together, or they can be stored separately and mixed using a static mixing device before being introduced to the reactor. The alkylene oxides can be introduced into the headspace of the reactor through a dip tube or spray nozzle or into the liquid phase in the reactor through a dip tube or sparge ring. The mixing impellers can be optimized to match the location of alkylene oxide addition to provide a high shear/mixing zone near the alkylene oxide injection location. The alkylene oxides can also be introduced to the recirculation line directly or via a static mixing device.

The reactor system includes a dosing system for the continuously added H-functional starter substance ($S_c$). When more than one continuously added H-functional starter substances ($S_c$) are used, these can be introduced to the reactor together or separately. They can be mixed and fed in together, or they can be stored separately and mixed using a static mixing device before being introduced to the reactor. The continuously added H-functional starter substance ($S_c$) can be introduced into the headspace of the reactor through a dip tube or spray nozzle or into the liquid phase in the reactor through a dip tube or sparge ring. The mixing impellers can be optimized to match the location of continuously added H-functional starter substance ($S_c$) addition point to provide a high shear/mixing zone near the continuously added H-functional starter substance ($S_c$) injection location. The continuously added H-functional starter substance ($S_c$) can also be introduced to the recirculation line directly or via a static mixing device. The continuously added H-functional starter substance ($S_c$) can also be premixed with the alkylene oxide and introduced to the reactor directly via a dip tube or sparge ring or via a static mixing device.

The finished polyoxyalkylene polyol product (P) of the present invention containing residual DMC catalysts can be vacuum stripped with steam and/or nitrogen to remove any residual compounds introduced from the reaction or the raw materials. The finished polyoxyalkylene polyol product (P) may also be inhibited with antioxidants known to the skilled artisan for polyether polyols. Examples of suitable antioxidants for polyoxyalkylene polyols include sterically hindered phenolic compounds such as BHT (i.e. butylated hydroxytoluene), octadecyl 3-(3,5-di-tert-butyl-4-hydroxyphenyl) propionate (i.e. Irganox 1076), 3,4-dihydro-2,5,7,8-tetramethyl-2-(4,8,12-trimethyltridecyl)-2H-1-benzopyran-6-ol (i.e. Irganox E-201), or other equivalent antioxidants or inhibitors. The finished polyoxyalkylene polyol product (P) may also be acidified with any inorganic protic mineral acid or organic acid which is known to be suitable as described in the art. The finished polyoxyalkylene polyol product (P) is preferably inhibited with an antioxidant prior to stripping, with or without steam and/or nitrogen. Additional inhibitor can be added after the stripping, with or without steam and/or nitrogen, and any acid addition, if required, is preferably added after the stripping, with or without steam and/or nitrogen. The final inhibitor and/or acid can be added directly to the stripping vessel, or to the storage vessel, or can be continuously added to the product in the transfer line between the stripping vessel and the storage vessel. Alternatively, the polyoxyalkylene polyol product (P) can be stored with only antioxidant and any required acid can be added to the storage vessel prior to shipment or to the shipping container, either directly to the container or added continuously to the transfer line between the storage vessel and the shipping container or prior to the final product use.

It was surprisingly found that the present process allows the feed of the continuously added alkylene oxide to the reactor such that the total time is less than 15 hours. This was found to work well when a gate agitator or a pitched blade was present in the reactor. It was also surprisingly found that this fast feed time for the alkylene oxide and the presence of a gate agitator or a pitched blade to provide intimate mixing in the reactor resulted in high equivalent weight (i.e. greater than or equal to 5000 Daltons) polyoxyalkylene polyethers with relatively lower viscosities than comparable equivalent weight products.

In a first embodiment, the invention is directed to a process for preparing a polyoxyalkylene polyol having an equivalent weight of at least 5000 Da, by the reaction of H-functional starter substances ($S_i$) and ($S_c$) with one or more alkylene oxides in the presence of a double metal cyanide catalyst, and which comprises (α) forming a starter mixture comprising the H-functional starter substance ($S_i$) and a double metal cyanide catalyst, and optionally, stripping the starter mixture with vacuum, with or without nitrogen and/or steam; (γ) continuously adding (a) an alkylene oxide to the starter mixture of step (α); and (δ) continuously adding an H-functional starter substance ($S_c$); wherein: (i) steps (γ) and (δ) either start simultaneously or step (γ) starts before step (δ); (ii) the H-functional starter substance ($S_i$) has an equivalent weight of at least 2000 Da and a functionality of 1 to 6; (iii) the H-functional starter substance ($S_c$) has a functionality of 1 to 6 and an equivalent weight of 9 Da to 150 Da; and (iv) in step (γ) the total time of addition of the continuously added alkylene oxide from the beginning of the feed to the end of the feed is less than 15 hours.

In a second embodiment, the invention is directed to the process according to the first embodiment wherein in step (δ) the addition of the H-functional starter substance ($S_c$) is stopped when at least 90% by weight, or preferably 95% by weight, of the total amount of alkylene oxide added in step (γ) has been added.

In a third embodiment, the invention is directed to the process according to the first or the second embodiments wherein the process additionally comprises (β) adding an activation amount of (b) an alkylene oxide to the starter mixture of step (α) to initiate the double metal cyanide catalyst, wherein the continuous addition of (a) an alkylene oxide in step (γ) is added to the mixture formed in step (β).

In a fourth embodiment, the invention is directed to the process according to one of the first to the third embodiments wherein in step (δ) the addition of the H-functional starter substance ($S_c$) is stopped when at least 90% by weight, or preferably 95% by weight, of the total amount of alkylene oxide added in steps (β) and (γ) has been added.

In a fifth embodiment, the invention is directed to the process according to one of the first to the fourth embodiments wherein said H-functional starter substance ($S_i$) has an equivalent weight that is less than 95% by weight, or preferably less than 90% by weight, of the equivalent weight of the polyoxyalkylene polyol (P) produced by the process.

In a sixth embodiment, the invention is directed to the process according to one of the first to the fifth embodiments wherein the H-functional starter substance ($S_i$) has a functionality of 1 to 6 and an equivalent weight ranging from at least 2000 Da to less than 5000 Da.

In a seventh embodiment, the invention is directed to the process according to one of the first to the sixth embodiments wherein step (γ) additionally comprises adding a double metal cyanide catalyst.

In an eighth embodiment, the invention is directed to the process according to one of the first to the seventh embodiments in which the continuously added H-functional starter substance ($S_c$) comprises ethylene glycol, propylene glycol, glycerin, butylene glycol, water or combinations thereof.

In a ninth embodiment, the invention is directed to the process according to one of the first to the eighth embodiments in which the continuously added H-functional starter substance ($S_c$) is present in an amount of from 20 mol % to 95 mol %, or from 30 to 90 mole %, based on the total hydroxyl-equivalent moles of initial H-functional starter substance ($S_i$) and continuously added H-functional starter substance ($S_c$).

In a tenth embodiment, the invention is directed to the process according to one of the first to the ninth embodiments in which (a) the alkylene oxide of (γ) and the continuously added H-functional starter substance ($S_c$) of (δ) are intimately mixed prior to entering the reactor.

In an eleventh embodiment, the invention is directed to the process according to one of the first to the tenth embodiments in which the intimate mixing occurs by dissolving the continuously added H-functional starter substance ($S_c$) of (δ) in (a) the alkylene oxide of (γ) prior to being continuously introduced into the reactor.

In a twelfth embodiment, the invention is directed to the process according to one of the first to the eleventh embodiments wherein (iv) in step (γ) the total time of addition of the continuously added alkylene oxide from the beginning of the feed to the end of the feed is less than 13 hours.

In a thirteenth embodiment, the invention is directed to the process according to one of the first to the twelfth embodiments in which the continuous addition of the continuously added H-functional starter substance ($S_c$) is started when the amount of the alkylene oxide being continuously added to the batch ranges from 0 weight percent to 50 weight percent, based on the total weight of continuously added alkylene oxide to be fed.

In a fourteenth embodiment, the invention is directed to the process according to one of the first to the thirteenth embodiments wherein (δ) the continuous addition of continuously added H-functional starter substance ($S_c$) proceeds until between 90 weight percent and 100 weight percent of the total batch weight has been completed.

In a fifteenth embodiment, the invention is directed to the process according to one of the first to the fourteenth embodiments wherein the process requires an agitator having at least one agitator blade that does not always directly agitate the liquid surface during the course of the alkylene oxide feed.

In a sixteenth embodiment, the invention is directed to the process according to fifteenth embodiment, wherein the agitator comprises a turbine-type impeller, a Rushton-type impeller, or a combination of the two.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

In the examples, the OH (hydroxyl numbers) were determined in accordance with ASTM D-4274-11, as described above, and are reported in mg [KOH]/g polyol.

Viscosity was determined in accordance with ASTM-D4878-15 as described above.

Gel Permeation Chromatography (GPC) was used to determine the molecular weights (weight average and number average) in accordance with DIN 55672-1 as described hereinabove. All molecular weights are number average unless specified otherwise.

In a 1-liter pitched blade stirred reactor system at 1301, 9000 Da equivalent weight (i.e. 18000 Da molecular weight, which is commonly referred to as 18K) polyoxyalkylene polyether diols were prepared by the following procedure. To the reactor, a DMC catalyst and H-functional starter substance ($S_i$) were charged, followed by the addition of a small amount (i.e. 5% by weight based on the amount of $S_i$) of propylene oxide to initiate the DMC catalyst. The amount of DMC catalyst used was sufficient to provide a final concentration of 100 ppm, based on the total weight of the polyol product. The mixture of the H-functional starter substance ($S_i$) and DMC catalyst was vacuum stripped with a slight nitrogen sparge at the reaction temperature for 30 minutes. Once the catalyst was active (as determined by a drop in reactor pressure during the initial phase of the propylene oxide feed), propylene oxide and H-functional starter substance ($S_c$) were continuously added to the reactor.

The double metal cyanide catalyst used in the examples was prepared in accordance with the procedure disclosed in U.S. Pat. No. 5,482,908.

In Example 1, the 2000 Da EW initial H-functional starter substance ($S_i$) was propoxylated using propylene oxide (PO) to 9000 Da EW in a conventional semi-batch (non-CAOS) process.

In Examples 2 and 3, the EW of the initial H-functional starter substance ($S_i$) is shown in Table 1. This initial H-functional starter substance ($S_i$) was propoxylated to 9000 Da EW using the continuous addition of starter (CAOS) process. The propylene glycol (PG) was dissolved in PO for continuous addition.

Example 4 used the same 2000 Da EW polyol as the H-functional starter substance ($S_i$) as in Example 1, and propoxylated this initial H-functional starter substance ($S_i$) to 9000 Da EW using the continuous addition of starter (CAOS) process.

In order to achieve the final 9000 Da EW polyol in Example 4, an intermediate removal of a quantity of polyol was necessary once the propoxylation reached the 6300 Da EW point. The continuous addition of starter (CAOS) process was then continued to a final polyol EW of 9000 Da.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a polyoxyalkylene polyether polyol having an equivalent weight of at least 5000 Da by reaction of H-functional starter substances ($S_i$) and ($S_c$) with one or more alkylene oxide(s) in the presence of a double metal cyanide catalyst, comprising
   (α) forming a starter mixture comprising said H-functional starter substance ($S_i$) and a double metal cyanide catalyst, and optionally, stripping the starter mixture with vacuum;
   (γ) continuously adding (a) an alkylene oxide to the starter mixture of step (α);
   (δ) continuously adding an H-functional starter substance ($S_c$);
   wherein:
   (i) steps (γ) and (δ) either start simultaneously or step (γ) starts before step (δ);
   (ii) said H-functional starter substance ($S_i$) has an equivalent weight of at least 2000 Da and a functionality of 1 to 6;
   (iii) said H-functional starter substance ($S_c$) has an equivalent weight of 9 Da to 150 Da and a functionality of 1 to 6;
   and
   (iv) in step (γ) the total time of addition of the continuously added alkylene oxide from the beginning of the feed to the end of the feed is less than 15 hours;
   wherein in step (δ) said continuous addition of said H-functional starter substance ($S_c$) is stopped when at least 90% by weight of the total amount of alkylene oxide added in step (γ) has been added.

TABLE 1

|  | Example: | | | |
|---|---|---|---|---|
|  | 1 | 2 | 3 | 4* |
| Initial Starter, $S_i$ | | | | |
| $S_i$ Eq Wt (g/mol) | 2000 | 3000 | 4000 | 2000 |
| $S_i$ (g) | 140.9 | 143.3 | 141.1 | 140.8 |
| Mol % $S_i$ | 100% | 66.8% | 50.3% | 42.5% |
| Continuous Starter, $S_c$ | | | | |
| $S_c$ Eq Wt (g/mol) | 38 | 38 | 38 | 38 |
| $S_c$ (g) | 0 | 0.90 | 1.33 | 3.62* |
| Mol % $S_c$ | 0 | 33.2% | 49.7% | 57.5% |
| % Continuous starter ($S_c$) in PO | 0% | 0.15% | 0.22% | 0.30% |
| PO (g) | 602.1 | 601.3 | 601.3 | 1201.5[4] |
| Addition time (PO) in hours | 5.0 | 5.0 | 2.5 | 3.3 |
| Measured Hydroxyl Number[1] (mg KOH/g) | 6.1 | 6.1 | 5.3 | 6.0 |
| Viscosity[2] (cks@25° C.) | 70026 | 38990 | 28435 | 27622 |
| GPC - PDI[3] | 1.19 | 1.09 | 1.10 | 1.16 |

[1] measured in accordance with ASTM-D4272-11
[2] measured in accordance with ASTM D-4878-15
[3] measured in accordance with DIN 5567201
[4] 602.1 g. of intermediate polyol was removed after 602.4 g. of H-functional continuous starter substance ($S_c$)/PO mixture was fed.

2. The process of claim 1, additionally comprising:
(β) adding an activation amount of (b) an alkylene oxide to the starter mixture of step (α) to initiate the double metal cyanide catalyst;
wherein the continuous addition of (a) an alkylene oxide in step (γ) is added to the mixture formed in step (p).

3. The process of claim 2, wherein in step (δ) the addition of the H-functional starter substance ($S_c$) is stopped when at least 90% by weight of the total amount of alkylene oxide added in steps (β) and (γ) has been added.

4. The process of claim 1, wherein (ii) said H-functional starter substance ($S_i$) has an equivalent weight that is less than 95% of the equivalent weight of the polyoxyalkylene polyol (P).

5. The process of claim 4, wherein (ii) said H-functional starter substance ($S_i$) has an equivalent weight that is less than 90% of the equivalent weight of the polyoxyalkylene polyol (P).

6. The process of claim 1, wherein (ii) said H-functional starter substance ($S_i$) has a functionality of 1 to 6 and an equivalent weight ranging from at least 2000 Da to less than 5000 Da.

7. The process according to claim 1, wherein step (γ) additionally comprises adding double metal cyanide catalyst.

8. The process according to claim 1, wherein the continuously added H-functional starter substance ($S_c$) comprises ethylene glycol, propylene glycol, glycerin, butylene glycol, water or combinations thereof.

9. The process according to claim 1, wherein said H-functional starter substance ($S_c$) is present in an amount of from 20 mol % to 95 mol %, based on the total hydroxyl-equivalent moles of initial H-functional starter substance ($S_i$) and continuously added H-functional starter substance ($S_c$).

10. The process according to claim 1, wherein (a) the alkylene oxide of (γ) and the continuously added H-functional starter substance ($S_c$) of (δ) are intimately mixed prior to entering the reactor.

11. The process according to claim 10, wherein the intimate mixing occurs by dissolving the continuously added H-functional starter substance ($S_c$) of (δ) in (a) the alkylene oxide of (γ) prior to being continuously introduced into the reactor.

12. The process according to claim 1, wherein (iv) in step (γ) the total time of addition of the continuously added alkylene oxide from the beginning of the feed to the end of the feed is less than 13 hours.

13. The process according to claim 1, in which the continuous addition of the continuously added H-functional starter substance ($S_c$) is started when the amount of the alkylene oxide being continuously added to the batch ranges from 0 weight percent to 50 weight percent, based on the total weight of continuously added alkylene oxide to be fed.

14. The process according to claim 1, wherein (δ) the continuous addition of continuously added H-functional starter substance ($S_c$) proceeds until between 90 weight percent and 100 weight percent of the total batch weight has been completed.

15. The process according to claim 1, wherein the process requires an agitator having at least one agitator blade that does not always directly agitate the liquid surface during the course of the alkylene oxide feed.

16. The process according to claim 15, wherein the agitator comprises a turbine-type impeller, a Rushton-type impeller, or a combination of the two.

* * * * *